(12) United States Patent
Barner

(10) Patent No.: US 9,933,809 B2
(45) Date of Patent: Apr. 3, 2018

(54) AUTOMATIC DATA RATE MATCHING

(71) Applicant: Cavium, Inc., San Jose, CA (US)

(72) Inventor: Steven C. Barner, Shrewsbury, MA (US)

(73) Assignee: Cavium, Inc., San Jose, CA (US)

(*) Notice: Subject to any disclaimer, the term of this patent is extended or adjusted under 35 U.S.C. 154(b) by 187 days.

(21) Appl. No.: 14/940,981

(22) Filed: Nov. 13, 2015

(65) Prior Publication Data

US 2016/0139622 A1    May 19, 2016

Related U.S. Application Data

(60) Provisional application No. 62/079,917, filed on Nov. 14, 2014.

(51) Int. Cl.
 *G06F 1/04*    (2006.01)
(52) U.S. Cl.
 CPC ..................... *G06F 1/04* (2013.01)
(58) Field of Classification Search
 None
 See application file for complete search history.

(56) References Cited

U.S. PATENT DOCUMENTS

| | | | | |
|---|---|---|---|---|
| 6,590,875 B1* | 7/2003 | Niwa | ..................... | H04B 1/745 370/328 |
| 6,622,182 B1* | 9/2003 | Miller | ..................... | G06F 3/14 709/232 |
| 2002/0067768 A1* | 6/2002 | Hurst | ............... | H04N 21/23406 375/240.03 |
| 2004/0181698 A1* | 9/2004 | Williams | .................. | G06F 1/28 713/300 |
| 2010/0321216 A1* | 12/2010 | Jonsson | .................. | H03M 5/02 341/61 |
| 2016/0077545 A1* | 3/2016 | Burleson | ................... | G06F 1/12 713/300 |

* cited by examiner

*Primary Examiner* — Paul J Yen
(74) *Attorney, Agent, or Firm* — Hamilton, Brook, Smith & Reynolds, P.C.

(57) ABSTRACT

Pacing of a producer, operating in a producer clock domain, may be based on at least one heuristic of a credit wire that is used to return credits to the producer. The returned credits may indicate that a consumer, operating in a consumer clock domain, has consumed data produced by the producer. The at least one heuristic may be a rate at which the credits are returned to the producer. Pacing the producer based on the rate at which the credits are returned to the producer may reduce latency of the data, flowing from the producer clock domain to the consumer clock domain, by minimizing an average number of entries in use in a First-In-First-Out (FIFO) operating in a pipeline between the producer and the consumer.

28 Claims, 7 Drawing Sheets

AUTOMATIC DATA RATE MATCHING

RELATED APPLICATIONS

This application claims the benefit of U.S. Provisional Application No. 62/079,917, filed on Nov. 14, 2014. The entire teachings of the above application are incorporated herein by reference.

BACKGROUND

A clock domain crossing occurs whenever data is transferred from a flop driven by one clock to a flop driven by another clock. Crossing the clock domains may cause metastability, data loss or other issues. To avoid metastability, a circuit design may include a multi-flop synchronizer to allow sufficient time for oscillations to settle down to ensure that a stable output is obtained in the destination domain. To avoid data loss, a circuit design for asynchronous domain crossings may include an asynchronous First-In First-Out (FIFO) while a circuit design for synchronous domain crossings may include a finite state machine (FSM).

SUMMARY

According to an embodiment, a method may comprise popping a FIFO at a consumer rate corresponding to a consumer clock domain; pushing the FIFO at a producer rate from an element operating in a producer clock domain, the producer rate slower than the consumer rate and the producer clock domain faster than the consumer clock domain; asserting a low indicator at the FIFO based on a fullness of the FIFO falling below a threshold; and increasing the producer rate for a period based on the low indicator asserted.

The method may further comprise determining the producer rate based on a credit return rate at which credits are returned from the consumer clock domain.

Increasing the producer rate for the period based on the low indicator asserted may cause a push to the FIFO a clock cycle earlier than otherwise caused by the producer rate.

The method may further comprise ignoring the low indicator asserted for an overlook time frame, following the push to the FIFO the clock cycle earlier than otherwise caused by the producer rate, to enable a given number of pushes to the FIFO at the producer rate, irrespective of the low indicator asserted. The overlook time frame may correspond to an integral number of producer clock domain clock cycles.

The element operating in the producer clock domain may be a converter element and the method may further comprise producing, as a function of the producer rate, units of data having a produced width, by a producer element operating in the producer clock domain. The method may further comprise converting the produced units of data having the produced width to converted units of data having a converted width, by the converter element. The produced width may be greater than the converted width. The method may further comprise returning credits, from the FIFO to the producer element, via a synchronizing element operating between the consumer and producer clock domains. Each credit returned may indicate consumption, of a popped unit of data from the FIFO, by a consumer element in the consumer clock domain. Each popped unit of data may have the converted width. The method may further comprise synchronizing the credits returned to the producer clock domain, by the synchronizer element, and determining the producer rate based on a credit return rate of the synchronized credits returned.

Determining the producer rate based on the credit return rate of the synchronized credits returned may include counting a number of producer clock domain clock cycles that transpire in an elapsed time frame, the elapsed time frame used for returning a given number of the synchronized credits, and wherein the method further comprises selecting a given number of produced units of data having the produced width for producing as a function of the number of producer clock domain clock cycles counted.

The given number of the synchronized credits may be a function of rounding down a value, to a nearest integer, and incrementing the rounded down value by one. The value may be computed by computing a product by multiplying the produced width by the selected given number of produced units of data having the produced width, left shifting the computed product by a shift count value of one or more, and dividing the left shifted computed product by the converted width.

The selected given number of produced units of data having the produced width may be a power of two. The selected given number of produced units of data having the produced width may be 32.

The method may further comprise pacing the producing, of the selected given number of produced units of data having the produced width, by the producer element as a function of the number of producer clock domain clock cycles counted.

Each unit of data having the produced width may be produced every N number of producer clock domain clock cycles, wherein the N number of producer clock domain clock cycles may be computed by: right shifting the number of producer clock domain clock cycles counted by a shift count value of one or more, and dividing the right shifted number of producer clock domain clock cycles by the selected given number of produced units of data having the produced width.

In an event dividing the right shifted number of producer clock domain clock cycles by the selected given number of produced units of data having the produced width results in a remainder value, pacing the producing may include delaying production of each next unit of data having the produced width to produce each next unit of data after the N number of producer clock domain clock cycles or after the N number of producer clock domain clock cycles plus one.

The threshold may be based on a disparity between the consumer and producer rates and a worst case delay for processing the low indicator asserted.

The method may further comprise determining the producer rate based on a credit return rate at which credits are returned from the consumer clock domain, to enable an amount of data in flight between a producer element, operating in the producer clock domain, and a consumer element, operating in the consumer clock domain, to be minimized, to reduce a fullness level for the FIFO and a latency of data flowing from the producer element to the consumer element, each credit returned indicating consumption, by the consumer element, of a popped unit of data from the FIFO.

According to another embodiment, a system may comprise a First-In First-Out (FIFO), a consumer element operating in a consumer clock domain configured to consume popped units of data from the FIFO at a consumer rate corresponding to the consumer clock domain, and a producer element operating in a producer clock domain. The producer element may be configured to produce units of data for pushing to the FIFO at a producer rate, the producer rate may be slower than the consumer rate and the producer clock domain may be faster than the consumer clock domain. The FIFO may be configured to assert a low indicator based on a fullness of the FIFO falling below a threshold and the producer rate may be increased for a period based on the low indicator asserted.

The producer element may be further configured to determine the producer rate based on a credit return rate at which credits are returned from the consumer clock domain.

The producer element may be further configured to increase the producer rate, increased for the period based on the low indicator asserted, causing a push to the FIFO a clock cycle earlier than otherwise caused by the producer rate.

The producer element may be further configured to ignore the low indicator for an overlook time frame, following the push to the FIFO the clock cycle earlier than otherwise caused by the producer rate, to enable a given number of pushes to the FIFO at the producer rate, irrespective of the low indicator asserted. The overlook time frame may correspond to an integral number of producer clock domain clock cycles.

The produced units of data may have a produced width, and the system may further comprise a converter element operating in the producer clock domain and configured to convert the produced units of data, having the produced width, to converted units of data, having a converted width, for pushing to the FIFO. The produced width may be greater than the converted width. The system may further comprise a synchronizer element operating between the consumer and producer clock domains. The FIFO may be further configured to return credits to the producer element, via the synchronizer element. Each credit returned may indicate consumption, of a popped unit of data from the FIFO, by the consumer element. Each popped unit of data may have the converted width. The synchronizer element may be configured to synchronize the credits returned to the producer clock domain, and the producer element may be further configured to determine the producer rate based on a credit return rate of the synchronized credits returned.

To determine the producer rate based on the credit return rate of the synchronized credits returned may include counting a number of producer clock domain clock cycles that transpire in an elapsed time frame used for returning a given number of the synchronized credits, and wherein the producer element is further configured to produce a selected given number of produced units of data having the produced width as a function of the number of producer clock domain clock cycles counted.

The given number of the synchronized credits may be a function of rounding down a value, to a nearest integer, and incrementing the rounded down value by one. The value may be computed by computing a product by multiplying the produced width by the selected given number of produced units of data having the produced width, left shifting the computed product by a shift count value of one or more, and dividing the left shifted computed product by the converted width.

The selected given number of produced units of data having the produced width may be a power of two. The selected given number of produced units of data having the produced width may be 32.

The producer element may be further configured to pace the producing of the selected number of produced units of data having the produced width as a function of the number of producer clock domain clock cycles counted.

Each unit of data having the produced width may be produced every N number of producer clock domain clock cycles, wherein the N number of producer clock domain clock cycles may be computed by right shifting the number of producer clock domain clock cycles counted by a shift count value of one or more, and dividing the right shifted number of producer clock domain clock cycles by the selected given number of produced units of data having the produced width.

In an event dividing the right shifted number of producer clock domain clock cycles by the selected given number of produced units of data having the produced width results in a remainder value, to pace producing may include delaying production of each next unit of data having the produced width to produce each next unit of data after the N number of producer clock domain clock cycles or after the N number of producer clock domain clock cycles plus one.

The threshold may be based on a disparity between the consumer and producer rates and a worst case delay for processing the low indicator asserted.

The producer element may be further configured to determine the producer rate based on a credit return rate at which credits are returned from the consumer clock domain, to enable an amount of data in flight between the producer element and the consumer element to be minimized, to reduce a fullness level for the FIFO and a latency of data flowing from the producer element to the consumer element, each credit returned indicating consumption, by the consumer element, of a popped unit of data from the FIFO.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1A:
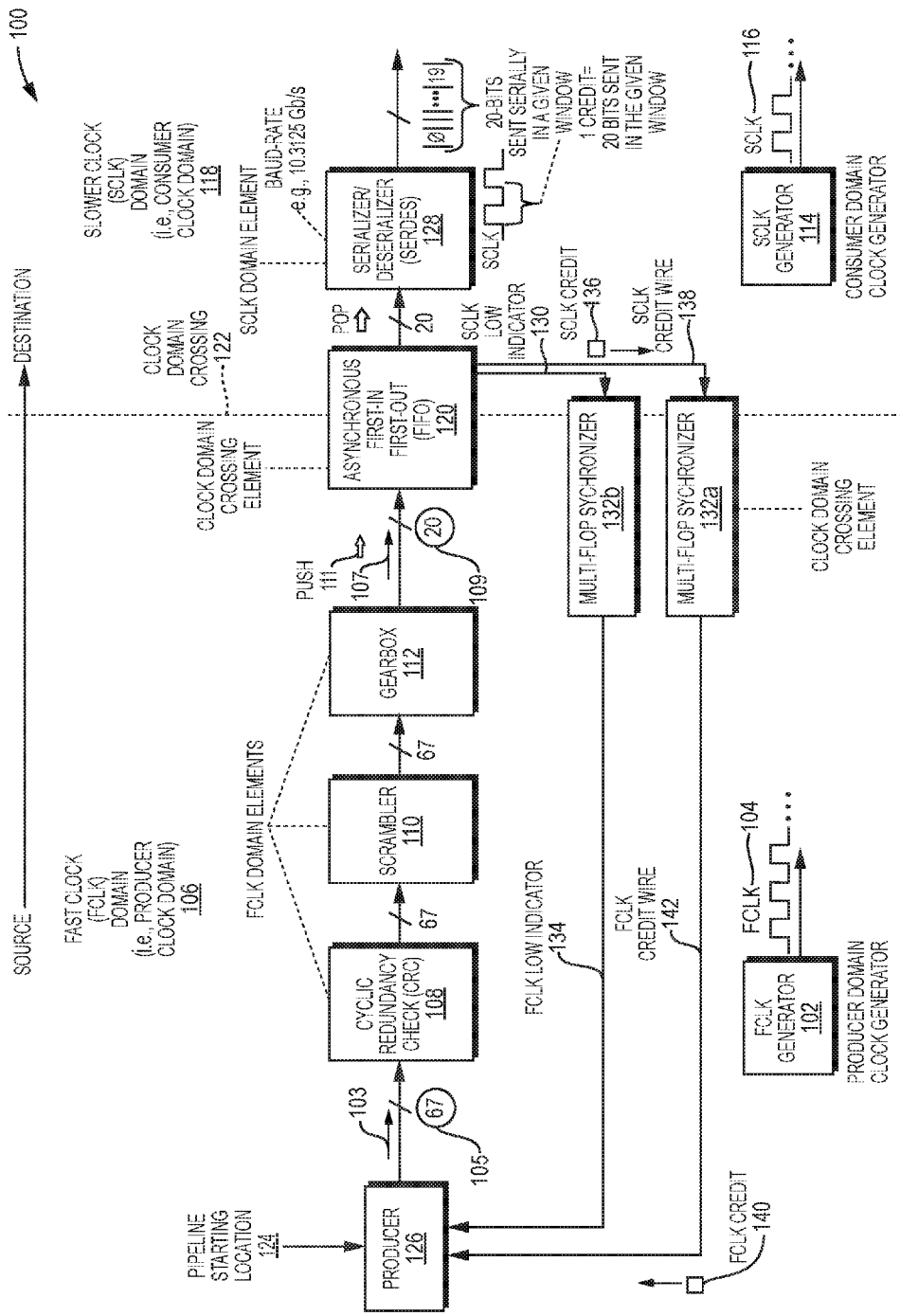
FIG. 1A is a block diagram of an example embodiment of a system.

A description of example embodiments of the invention follows.

In a system that is based on multiple clocks, each clock may be considered as forming a "clock domain." For example, elements of the system that are driven by a given clock of the multiple clocks may be understood as located in a given "clock domain." In the system, data may be transferred from the given clock domain to another clock domain. For example, an element driven by the given clock may send data to another element that is driven by another clock, resulting in a clock domain crossing.

An element sending the data may be referred to as a producer while the other element receiving the data may be referred to as a consumer. The producer may be in a fast clock (FCLK) domain, referred to interchangeably herein as a producer clock domain, while the consumer may be in a slower clock (SCLK) domain, referred to interchangeably herein as a consumer clock domain, that is slower relative to the FCLK domain. In the system, data may be produced in the FCLK domain (i.e., the producer clock domain) and consumed every cycle in the SCLK domain (i.e., the consumer clock domain), requiring pacing of the producer in a manner that enables delivery to the consumer on every SCLK. In the system, a synchronizing element, such as an asynchronous First-In First-Out (FIFO), may be used as part of a pacing mechanism. A cycle of the FCLK (i.e., the producer clock domain clock) may be referred to interchangeably herein as a producer clock domain clock cycle whereas a cycle of the SCLK (i.e., the consumer clock domain clock) may be referred to interchangeably herein as a consumer clock domain clock cycle.

For example, the producer may produce data for pushing into the asynchronous FIFO on some FCLKs, that is, not every FCLK, while the consumer may pop the FIFO on every SCLK. The producer may increment a counter for each push into the asynchronous FIFO and the consumer may return a credit on every SCLK that may be used to decrement the counter. The producer may be configured to only produce data when a value of the counter indicates that the asynchronous FIFO is not full. As such, the credits may be applied for flow controlling data into the asynchronous FIFO to prevent overflow of the FIFO while pacing the producer.

The system disclosed above may be applicable to a Serializer/Deserializer (SerDes) lane, the building block of many higher level protocols, such as Interlaken. Many of the higher level protocols, such as Interlaken, use an encoding scheme, such as 64 B/67 B which has a word size of 67 bits. In a pipeline of elements in a SerDes lane, a number of bits of a word produced in the FCLK domain may be referred to interchangeably herein as FCLK_BITS or a produced width. A producer in the FCLK domain may be configured to produce data that is an integral multiple of FCLK_BITS.

In the pipeline, the SerDes may be in the SCLK domain and a data-path to the SerDes may be much smaller, such as 10, 20, or 40 bits. A number of bits in a width of the SerDes may be referred to interchangeably herein as SCLK_BITS. As such, a converter in the pipeline may be configured to convert a stream of width FCLK_BITS into a stream of width SCLK_BITS (also referred to interchangeably herein as a converted width). Such a converter may be referred to interchangeably herein as a gearbox.

In the system, the asynchronous FIFO may be sized to avoid underflowing for the worst case clock ratio between the FCLK and the SCLK. Underflowing the asynchronous FIFO (i.e., FIFO underrun) may occur if the FIFO has no data to pop on a given SCLK. Since the SerDes would need to send a valid number of bits, serially, per SCLK (e.g., 20 bits per SCLK), an underrun of the asynchronous FIFO would result in bit corruption and, thus, should be avoided. A worst case clock ratio may be based on a minimum value of FCLK for a given SCLK. Sizing for such a worst case ratio may result in the asynchronous FIFO holding (i.e., buffering) more data than necessary for all other clock ratios when in operation. While a design that is based on sizing the FIFO for the worst case clock ratio may be operationally functional, such a worst case sizing adds latency.

In addition, in a SerDes lane, data may be produced in many stages prior to the conversion of the gearbox disclosed above. For example, prior to the conversion, many higher level protocols, such as Interlaken, have several stages, such as a cyclic redundancy check (CRC) stage, data scrambling stage, lane striping stage, or any other suitable stage. As such, either a small FIFO in the gearbox may be needed to store words ready for the conversion from FCLK_BITS to SCLK_BITS or credits from the asynchronous FIFO in the SerDes lane would need to be passed to the start of the producer's pipeline. Either option requires more data in-flight, and, therefore, further adds to latency.

According to embodiments disclosed herein, a number of data elements (e.g., words) that are in-flight may be minimized. While the asynchronous FIFO must still be sized for the worst case clock ratio, minimizing words in flight will reduce the average fullness of the FIFO. As such, embodiments disclosed herein may reduce latency by minimizing the average number of entries in use in the FIFO.

According to embodiments disclosed herein, pacing of a producer may be based on at least one heuristic of a credit wire that is used to send credits to the producer. A credit may be an indication that a consumer has consumed a word. A producer word may be, for example, 67 bits, and the credit may correspond to an entry in the asynchronous FIFO that is popped. As aforementioned, this may be 10/20/40 bits. The indication may be a rising or falling edge of a signal or any other suitable indication that the consumer has consumed data, i.e., SCLK_BITS of data as described herein below. The at least one heuristic may be a rate at which credits are returned to the producer. The rate at which credits are returned to the producer may be referred to interchangeably herein as the credit return rate.

FIG. 1A is a block diagram of an example embodiment of a system 100. The system 100 may be implemented as a SerDes lane. The system 100 includes a fast clock (FCLK) generator 102 configured to generate an FCLK clock signal 104 with an FCLK clock frequency for an FCLK clock domain (i.e., producer clock domain) 106. The system 100 includes a slower clock (SCLK) generator 114 configured to generate an SCLK clock signal 116 with an SCLK clock frequency for an SCLK clock domain (i.e., consumer clock domain) 118 that is slower than the FCLK clock frequency of the FCLK clock signal 104.

The FCLK clock domain 106 includes a cyclic redundancy check (CRC) stage 108, a scrambler stage 110, and a gearbox stage 112 that may be clocked (i.e., driven) based on the FCLK clock signal 104. In the example embodiment, FCLK_BITS (i.e., 67-bit data word) enter the CRC stage 108 from a producer 126 at a pipeline starting location 124. The CRC stage 108 may compute a CRC of the FCLK_BITS, and transfer the FCLK_BITS to the scrambler stage 110 which scrambles the FCLK_BITS and forwards the scrambled output to the gearbox stage 112 for conversion to SCLK_BITS (i.e., 20-bit word). The gearbox stage may convert the scrambled FCLK_BITS for consumption in the SCLK domain 118, for example, by converting a stream of width FCLK_BITS (i.e., produced width) into a stream of width SCLK_BITS (i.e., converted width).

Figure 2A:
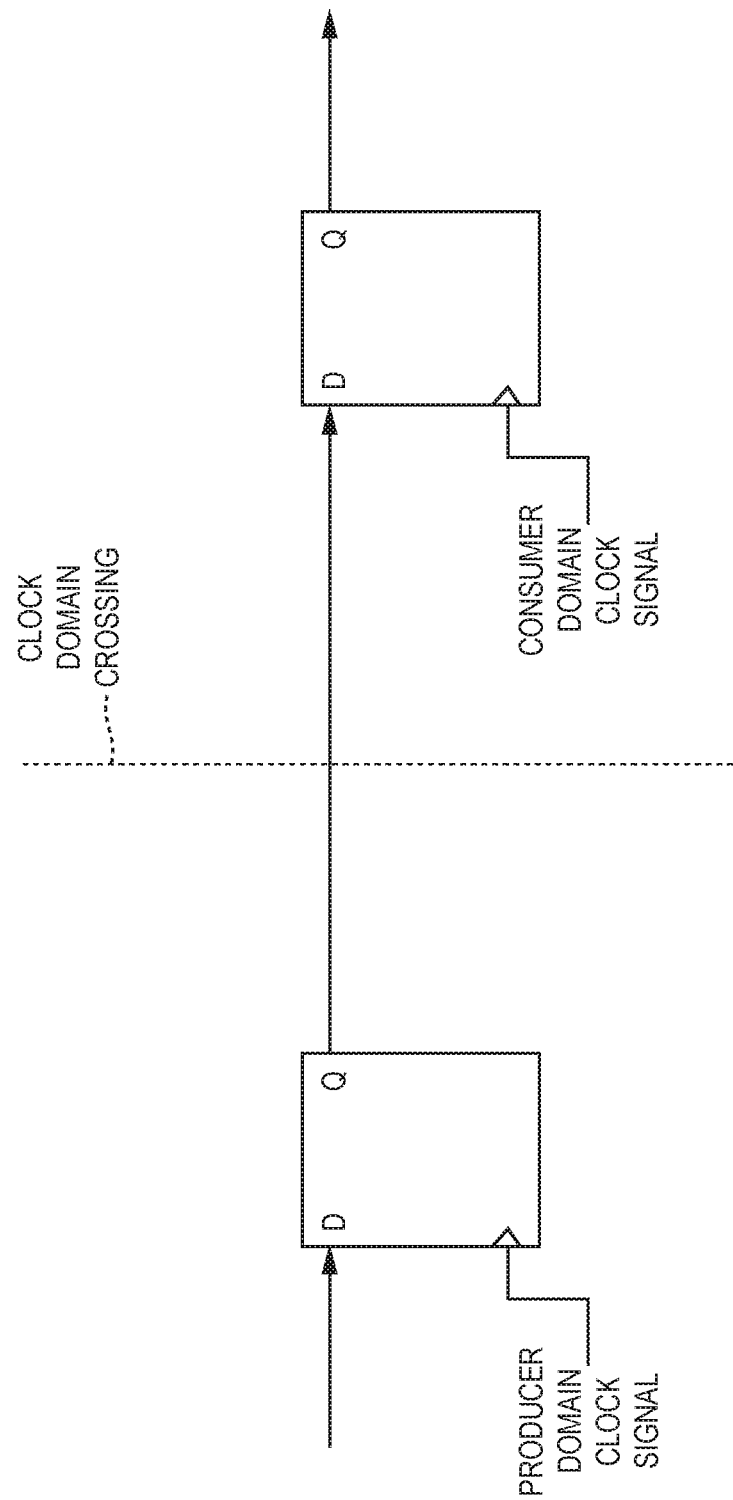
FIG. 2A illustrates an example of a clock domain crossing.

The system 100 includes an asynchronous FIFO 120 located at the clock domain crossing 122 and may be referred to as a first synchronizing element. The asynchronous FIFO 120 is an example of a domain crossing element that is clocked based on both the producer domain clock signal FCLK and the consumer domain clock signal SCLK. This is shown conceptually in FIG. 2A.

The gearbox stage 112 may push the SCLK_BITS to the asynchronous FIFO 120 on a given FCLK cycle (not shown) at a pace rate set at the producer 126 that is less than a consumer data rate at which SCLK_BITS are popped from the FIFO 120 in the SCLK domain. The pace rate may be on average slightly less than such consumer data rate.

The rate at which the asynchronous FIFO 120 returns credits to the producer, i.e., the producer 126, in the FCLK domain 106, may be employed to compute the data rate of the consumer, i.e., the Serializer/Deserializer (SerDes) 128 in the SCLK domain 118 as a function of the FCLK 104. The data rate computed may be employed to pace the data producer, i.e., the producer 126, in the FCLK domain at the pace rate. In the example embodiment of the system 100, the FIFO 120 may return the credits to the producer 126 via a multi-flop synchronizer 132a. The multi-flop synchronizer 132a may be configured to synchronize SCLK credits 136 sent from the FIFO 120 via an SCLK credit wire 138 to the producer clock domain 106 and send the synchronized credits, i.e., FCLK credits 140, to the producer 126 via the FCLK credit wire 142.

The asynchronous FIFO 120 may be configured to assert a low indicator to the producer 126 in an event a number of entries in the asynchronous FIFO 120 is below a low count value. For example, an SCLK low indicator 130 may be generated based on the SCLK (i.e., the consumer domain clock) 116 and synchronized in the producer clock domain 106 by the multi-flop synchronizer 132b, that is a synchronizer element operating between the consumer clock domain 118 and the producer clock domain 106. The producer 126 may use the synchronized asserted low indicator (i.e., FCLK low indicator) 134 to produce the next word of data an FCLK sooner than dictated by the pace rate (also referred to interchangeably herein as a producer rate), so enabling the pace rate to be slightly slower than the actual data rate of the SerDes 128.

Figure 2B:
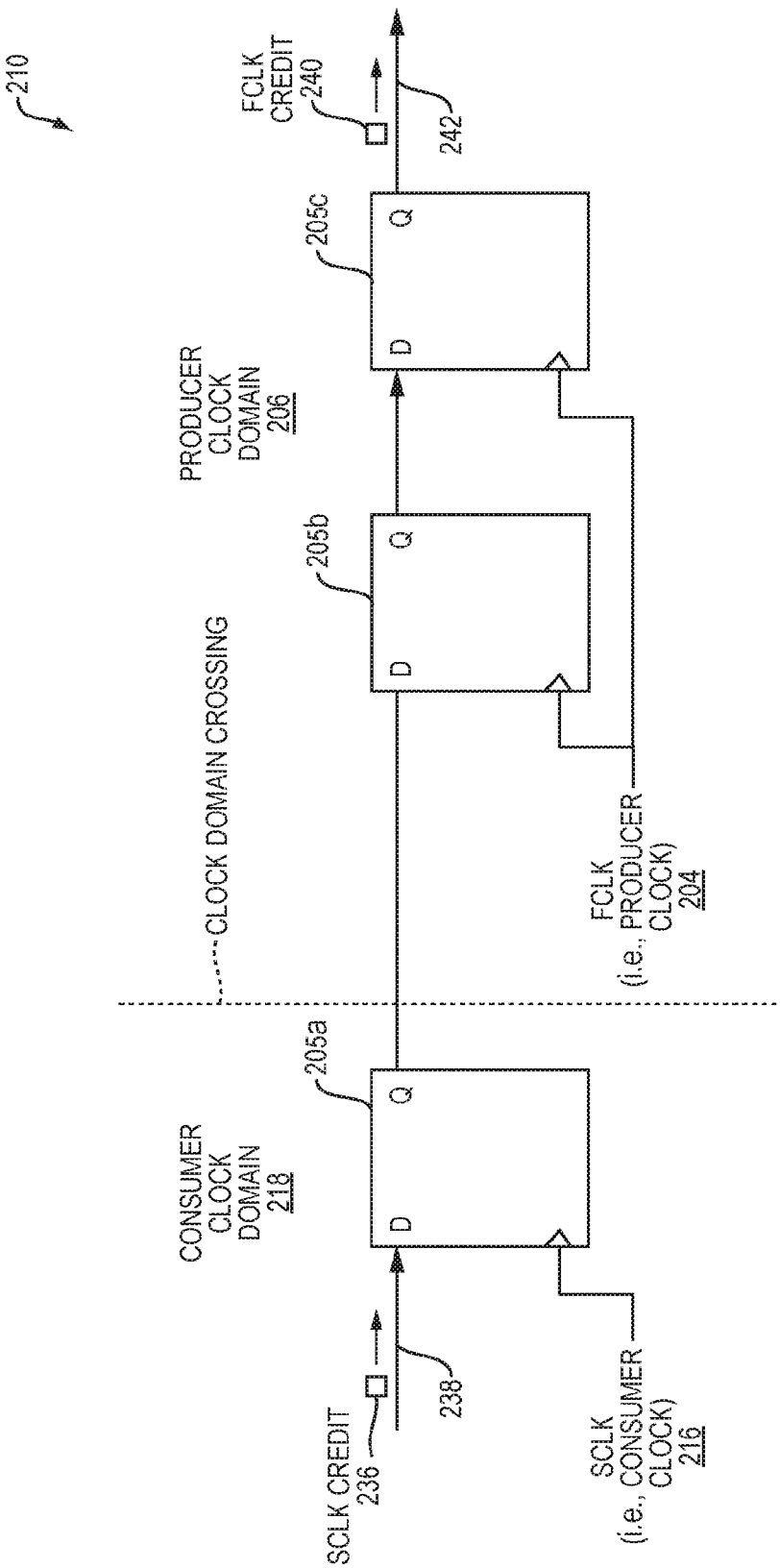
FIG. 2B is a block diagram of an example embodiment of a multi-flop synchronizer of FIG. 1A.

FIG. 2B is a block diagram 210 of an example embodiment of the multi-flop synchronizer 132a of FIG. 1A. The multi-flop synchronizer 132a may be configured to synchronize SCLK credits 236 sent from the FIFO 120 via an SCLK credit wire 238 to the producer clock domain 206 and send the synchronized credits, i.e., the FCLK credits 240, to the producer 126 via the FCLK credit wire 242. The multi-flop synchronizer 132a may employ multiple D flip-flops, such as D flip-flops 205a, 205b, and 205c, wherein the D flip-flops in the consumer clock domain 218 are clocked based on the consumer clock 216 (i.e., SCLK) and the D flip-flops in the producer clock domain 206 are clocked based on the producer clock 204 (i.e., FCLK). It should be understood that any suitable number of D flip-flops may be employed by the multi-flop synchronizer 132a.

Figure 2C:
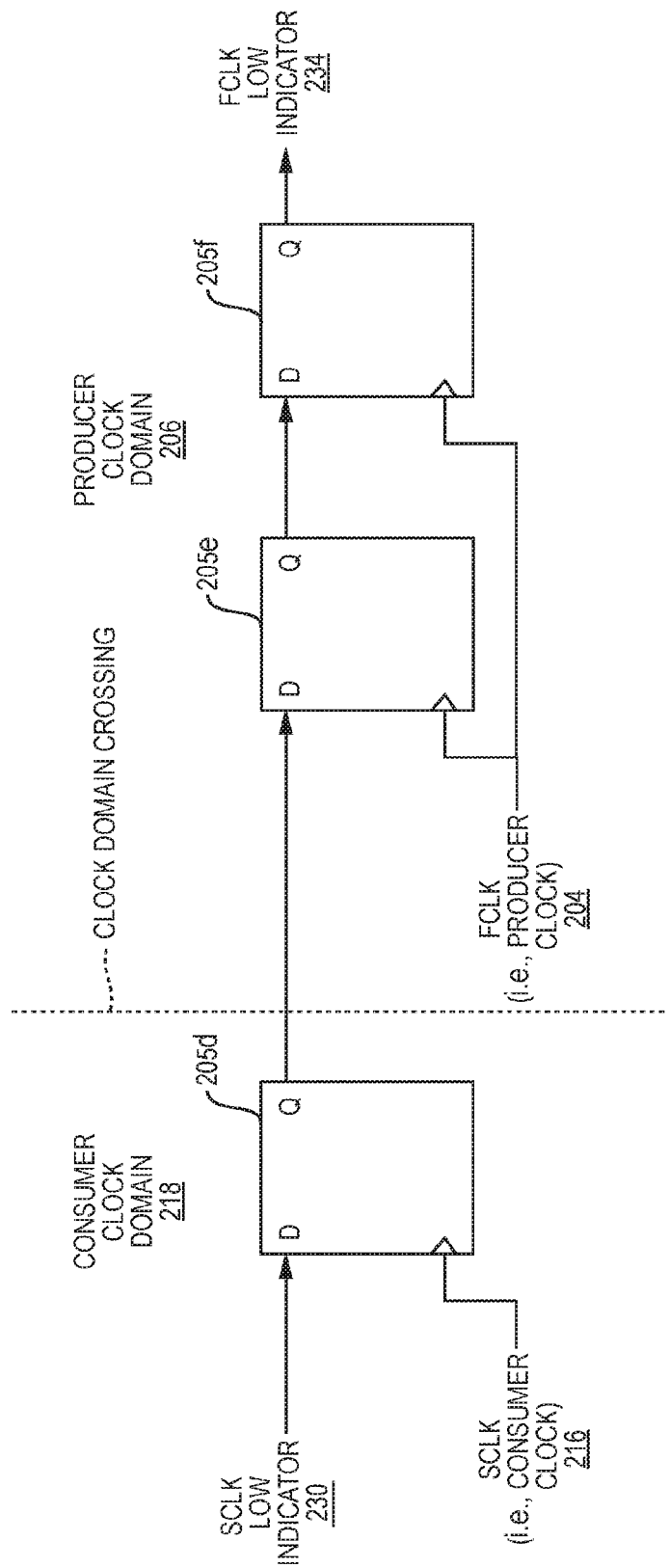
FIG. 2C is a block diagram of an example embodiment of another multi-flop synchronizer of FIG. 1A.

FIG. 2C is a block diagram of an example embodiment of the multi-flop synchronizer 132b of FIG. 1A. The multi-flop synchronizer 132b may be configured to synchronize the SCLK low indicator 230 sent from the FIFO 120 and send the synchronized low indicator, i.e., FCLK low indicator 234, to the producer 126. The multi-flop synchronizer 132b may employ multiple D flip-flops, such as D flip-flops 205d, 205e, and 205f, wherein the D flip-flops in the consumer clock domain 218 are clocked based on the consumer clock 216 (i.e., SCLK) and the D flip-flops in the producer clock domain 206 are clocked based on the producer clock 204 (i.e., FCLK). It should be understood that any suitable number of D flip-flops may be employed by the multi-flop synchronizer 132b.

In the example embodiment of the system 100 of FIG. 1A, the produced units of data 103 have a produced width 105 of 67 bits. A converter element, that is, the gearbox stage 112, is operating in the producer clock domain 106 and configured to convert the produced units of data 103 having the produced width 103 to converted units of data 107 having a converted width 109 of 20 bits, for pushing 111 to the FIFO. The produced width 103 is greater than the converted width 109. Further, a synchronizer element, such as the multi-flop synchronizer 132b, is operating between the consumer and producer clock domains, 118 and 106, respectively, wherein the FIFO 120 is configured to return the SCLK credits 136 to the producer 126, via the multi-flop synchronizer 132b, each credit returned indicating consumption, of a popped unit of data from the FIFO 120, by a consumer element, that is, the SerDes 128. Each popped unit of data has the converted width 109 and the multi-flop synchronizer 132b is configured to synchronize the SCLK credits 136 to return the FCLK credits 140 to the producer clock domain 106. According to embodiments disclosed herein, the producer 126 is configured to determine the pace rate (i.e., the producer rate) based on a credit return rate of the synchronized credits (i.e., FCLK credits 140) that are returned.

Figure 1B:
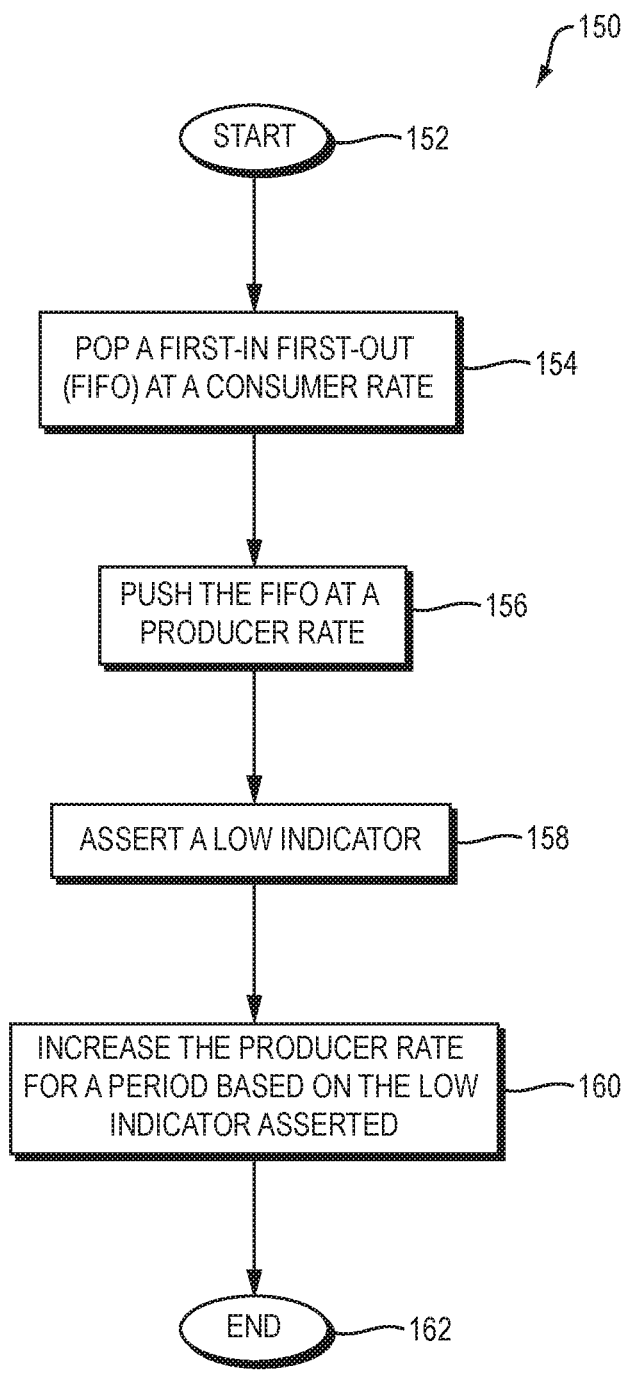
FIG. 1B is a flow diagram of an example embodiment of a method.

FIG. 1B is a flow diagram (150) of an example embodiment of a method. The method may begin (152) and pop a First-In First-Out (FIFO) at a consumer rate corresponding to a consumer clock domain (154). The method may push the FIFO at a producer rate from an element operating in a producer clock domain, the producer rate may be slower than the consumer rate and the producer clock domain may be faster than the consumer clock domain (156). The method may assert a low indicator at the FIFO based on a fullness of the FIFO falling below a threshold (158). The method may increase the producer rate for a period based on the low indicator asserted (160) and the method thereafter ends (162) in the example embodiment.

In another embodiment, the system 100 in FIG. 1A is configured to operate as follows.

(1) The rate at which the asynchronous FIFO 120 returns credits is used to calculate the data rate as a function of FCLK.

(2) The calculated consumer data rate (e.g., SerDes data rate) in (1) is used to pace the FCLK data producer, i.e., producer 126, at a producer data rate which is slightly slower than the actual consumer data rate.

(3) A low indicator is asserted, such as the low indicator 134, when the number of entries in the asynchronous FIFO 120 falls below a threshold LOW_CNT, such as the low level threshold 406 shown in FIG. 4, disclosed below.

(4) The assertion of the low indicator from (3) is used to indicate to the data producer, i.e., producer 126, to produce the next word of data an FCLK sooner than dictated by the producer data rate calculated from (2). As such, the producer rate (i.e., pace rate) may be increased for a period based on the low indicator asserted, causing a push to the FIFO 120 a clock cycle earlier than otherwise caused by the producer rate.

(5) After completing (4), the low indicator asserted is ignored during the production of the next WAIT_CNT words to allow the asynchronous FIFO 120 to recover. A value for WAIT_CNT may be a programmable value. As such, further assertions of the low indicator 134, may be ignored for a wait time frame (i.e., WAIT_CNT), also referred to interchangeably herein as an overlook time frame, following the push to the FIFO 120 the clock cycle earlier than otherwise caused by the producer rate (i.e., the pace rate), to enable a given number of pushes to the FIFO 120 at the producer rate, irrespective of the low indicator 134 asserted.

(6) The calculation of data rate as a function of FCLK in (1) is performed by counting the number of FCLKs (FCLK_CNT) that occur in the window of time required for the asynchronous FIFO 120 to return a fixed number of credits, NUM_CREDITS, such that the resulting count (i.e., FCLK_CNT) has the following property:

FCLK_CNT=NUM_CREDITS*SCLK_BITS/
   GBAUD*FCLK_FREQ.

As such, determining the producer rate (i.e., pace rate) based on the credit return rate of the synchronized credits returned, may include counting a number of producer clock domain clock cycles (i.e., a number of FCLK cycles) that transpire in an elapsed time frame used for returning a given number of the synchronized credits, such as the fixed number of credits, NUM_CREDITS. For example, the FCLK_CNT represents how many producer clock domain clock cycles transpire while waiting for a given number of credits, that is, a number of credits given by NUM_CREDITS.

(7) The NUM_CREDITS in (6) is selected such that NUM_CREDITS*SCLK_BITS is slightly less than:

((FCLK_BITS*32)<<SHIFT_CNT), wherein
   SHIFT_CNT>0, and

NUM_CREDITS=round-down(((FCLK_BITS*32)
   <<SHIFT_CNT)/20)+1, enabling a data rate of the producer to be slightly less than that of the consumer.

As such, the given number of the synchronized credits is a function of rounding down a value, to a nearest integer, and incrementing the rounded down value by one. As disclosed in (7) above, the value is computed by computing a product by multiplying the produced width by a selected given number of produced units of data having the produced width, left shifting the computed product by a shift count value of one or more, and dividing the left shifted computed product by the converted width (i.e., 20).

(8) The LOW_CNT in (3) is selected based on the disparity between the actual data rate and the slightly slow data rate as well as the worst case delay to process (4). As such, a threshold for the FIFO, that is, the LOW_CNT, may be based on a disparity between the consumer and producer rates and a worst case delay for processing the low indicator asserted.

(9) The pacing of the producer in (2) is performed by producing a word of data every ((FCLK_CNT>>SHIFT_CNT)/32) FCLK cycles, with:

FCLK_CNT_PER_WORD=
   (FCLK_CNT>>SHIFT_CNT)/32.

As such, pacing the producing is a function of the number of producer clock domain clock cycles that are counted, that is, the FCLK_CNT. The selected given number of produced units of data having the produced width may be 32, as employed above in (9).

It should be understood that the selected given number of produced units of data having the produced width may be any suitable value that enables a hardware implementation of reduced complexity. For example, by employing a divisor that is a power of two, such as 32 (i.e., $2^5$), a hardware implementation for the division may be based on a modulo operation that may be implemented using common hardware, such as AND gates and right shifters, as opposed to complex circuitry for implementing natural dividers to support arbitrary divisors.

The selected given number of produced units of data having the produced width represents a number of data words to produce over a determined time frame, whereby the determined time frame may be an amount of time that was determined by waiting for a given number of credits to be returned from the consumer domain, that is, an elapsed time frame used for returning a given number of the synchronized credits. The given number of produced units of data may be produced over the determined time frame (i.e., the elapsed time frame) in a manner that paces the production over the entire determined time frame. For example, a spacing between consecutively produced units of data may be one or more FCLKs such that a number of FCLKs transpiring between consecutively produced units of data may be variable. The production of the produced units of data may be distributed on certain FCLKs occurring in the determined time frame to enable a production distribution that is spread over the entire determined time frame and with as uniform a spacing as possible between consecutively produced data units.

Figure 3:
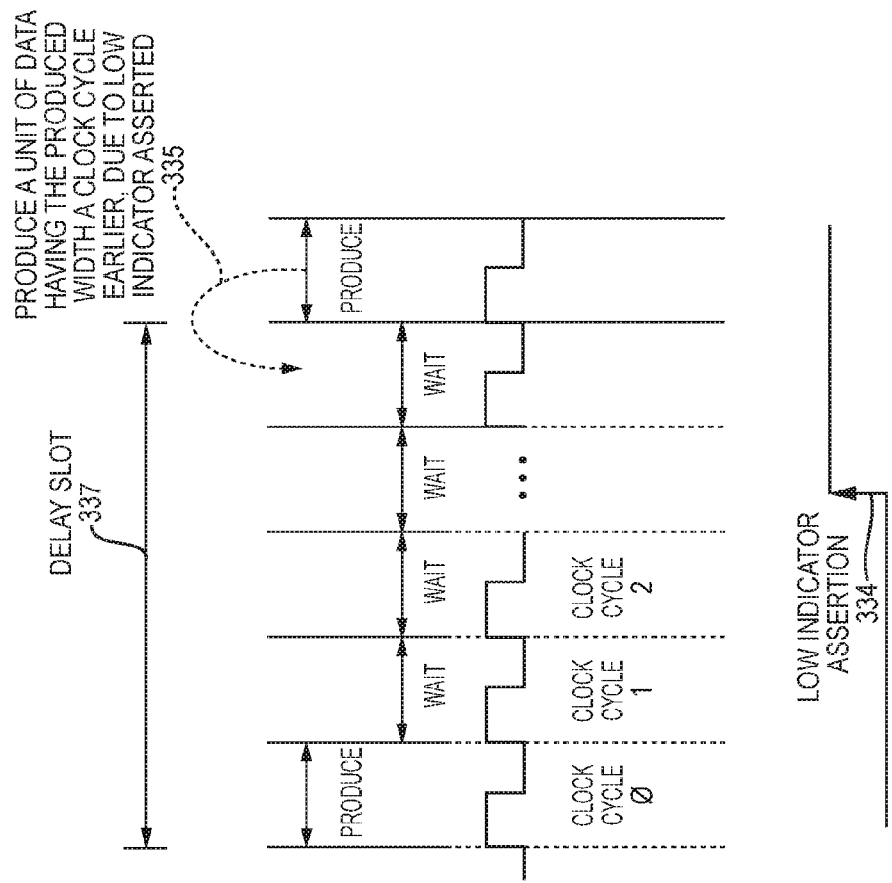
FIG. 3 illustrates pacing data from a producer in accordance with the present disclosure.

(10) The fraction from (9), above, may be handled by using 32 delay slots, delaying the production of the next word by either FCLK_CNT_PER_WORD FCLK cycles or FCLK_CNT_PER_WORD+1 FCLK cycles, taking care to spread the +1 evenly to improve worst case delay to process (4). A delay slot may be defined as a number of FCLK cycles (i.e., producer clock domain clock cycles) between a pair of consecutively produced units of data having the produced width, such as the delay slot 337 of FIG. 3. Since a selected given number of produced units of data having the produced width is 32, in the example embodiment, 32 units of data having the produced width are produced, and, thus, 32 delay slots, such as the delay slot 337 of FIG. 3, are determined, with each delay slot being a certain number of FCLK cycles between consecutively produced units of data having the produced width. The certain number of FCLK cycles would be selected from either FCLK_CNT_PER_WORD or FCLK_CNT_PER_WORD+1. It should be understood that each produced unit of data having the produced width would result in multiple pushes to the FIFO 120, as the gearbox stage 112 converts each unit of data having the produced width to units of data having the consumer width, resulting in, for example, 3 or 4 pushes to the FIFO 120 for each produced unit of data. It should be understood that the number of pushes may be any suitable number.

As such, in an event dividing the right shifted number of producer clock domain clock cycles by the selected given number of produced units of data having the produced width results in a remainder value, pacing the producing may include delaying production of each next unit of data having the produced width (e.g., 67) to produce each next unit of data after the N number of producer clock domain clock cycles or after the N number of producer clock domain clock cycles plus one.

(11) Example pseudocode for (10), wherein half of the +1s are in the first 16 delay slots and half are in the second 16 delay slots of the 32 delay slots total, and an example calculation are as follows:

FCLK=1.8 GHZ
SHIFT_CNT=2
SerDes=10.3125 GB/s (1) Count the number of FCLKs it takes to get (108<<1) credits since:
   108 credits==2160 bits==slightly more than 32 67-bit words==2144 bits.

(2) This may result in 750 FCLK cycles, meaning:
STALL_BASE=(750>>SHIFT_CNT)/32 (750>>6)==11
STALL_BUMP=(750>>SHIFT_CNT) & 31==23.
(3) 16 delay slots, stall either STALL_BASE or (STALL_BASE+1), such that:

```
for (delay_slot=0; delay_slot<32; delay_slot++) {
    DELAY = STALL_BASE
    if ((delay_slot >> 4) | ((delay_slot & 0xf) << 1))
        DELAY += (delay_slot < STALL_BUMP);
}
```

This becomes an average of (750>>SHIFT_CNT)/32)= 11.71875 cycles:
(12+12+12+12+12+12+12+12+12+12+12+12+11+11+11+11+12+12+12+12+12+12+12+12+12+12+12+12+11+11+11+11)/32. As such, a selected given number of produced units of data having the produced width is 32, in the example embodiment, and, as such, 32 units of data having the produced width are produced, with a delay slot between each pair of consecutively produced units of data having the produced width, some of the delay slots being 12 FCLKs and some of the delay slots being 11 FCLKs.

Based on the above 1, 2, and 3, the producer may be paced at a data rate which is slightly slower than 10.3125 GB/s, as shown by the following calculation:
(1 producer word/11.71875 FCLKs)*(67 bits/1 producer word)*(1 FCLK/0.5556 ns)=10.291 GB/s.

Note that in the foregoing pseudocode, STALL_BASE is FCLK_CNT_PER_WORD, that is, (FCLK_CNT>>SHIFT_CNT)/32, and STALL_BUMP is (FCLK_CNT>>SHIFT_CNT) & 0x1f. It should be understood that both STALL_BASE and STALL_BUMP may be implemented with non-complex hardware. For example, STALL_BASE and STALL_BUMP may be implemented based on common hardware, such as AND gates and right shifters. By employing a divisor that is a power of two, such as 32 (i.e., $2^5$), a hardware implementation for the division may be based on a modulo operation that may be implemented using such common hardware, as opposed to complex circuitry for implementing natural dividers to support arbitrary divisors.

The pacing disclosed in (9) above is illustrated conceptually in FIG. 3, where a unit of data having the produced width is produced by the producer 126 in an FCLK cycle 0 that is followed by several FCLK cycles, cycles 1, . . . , cycles n, in which no data is produced. A time span between a pair of consecutively produced units of data having the produced width may be referred to interchangeably herein as a delay slot, such as the delay slot 337 that includes the FCLK cycle 0, in which data is produced, followed by several FCLK cycles, cycles 1, . . . , cycles n, that is, wait cycles (i.e., delay cycles), in which no data is produced. FIG. 3 also illustrates the feature described in (3) and (4) above, in which the producer 126 produced a unit of data having the produced width a clock cycle earlier 335 based on a low indicator having been asserted, that is, the low indicator assertion 334, thus, causing a push to the FIFO 120 a clock cycle earlier than otherwise caused by the producer rate. As disclosed in (5) above, further assertions of the low indicator, such as the low indicator assertion 334, may be ignored for a wait time frame (not shown), following the production of the unit of data having the produced width the clock cycle earlier 335, to enable a given number of pushes to the FIFO 120 at the producer rate, irrespective of the low indicator asserted. The wait time frame may be referred to interchangeably herein as an overlook time frame that corresponds to an integral number of producer clock domain clock cycles for which assertions of the low indicator are overlooked (i.e., ignored). It should be understood that while the low indicator assertion 334 of FIG. 3 is shown as a transition from a low state to a high state, the low indicator assertion 334 may be implemented in any suitable way, such as a high state to low state transition, or any other suitable signaling.

Since the producer 126 produces the unit of data having the produced width the clock cycle earlier 335 based on the low indicator assertion 334, a spike event, such as a sudden increase in the producer rate, may be generated in the producer clock domain 106; however, an effect caused by the spike event, such as an increase in an amount of data stored in the FIFO 120, may not occur until after a certain number of producer domain clock cycles following the spike event. By ignoring assertions of the low indicator, such as the low indicator assertion 334, for the overlook time frame, time may be given to allow the effect, caused by the spike event, to transpire, before enabling another spike event to be generated. The overlook time frame may be 64 producer clock domain clock cycles, or any other suitable integral number of producer clock domain clock cycles.

Figure 4:
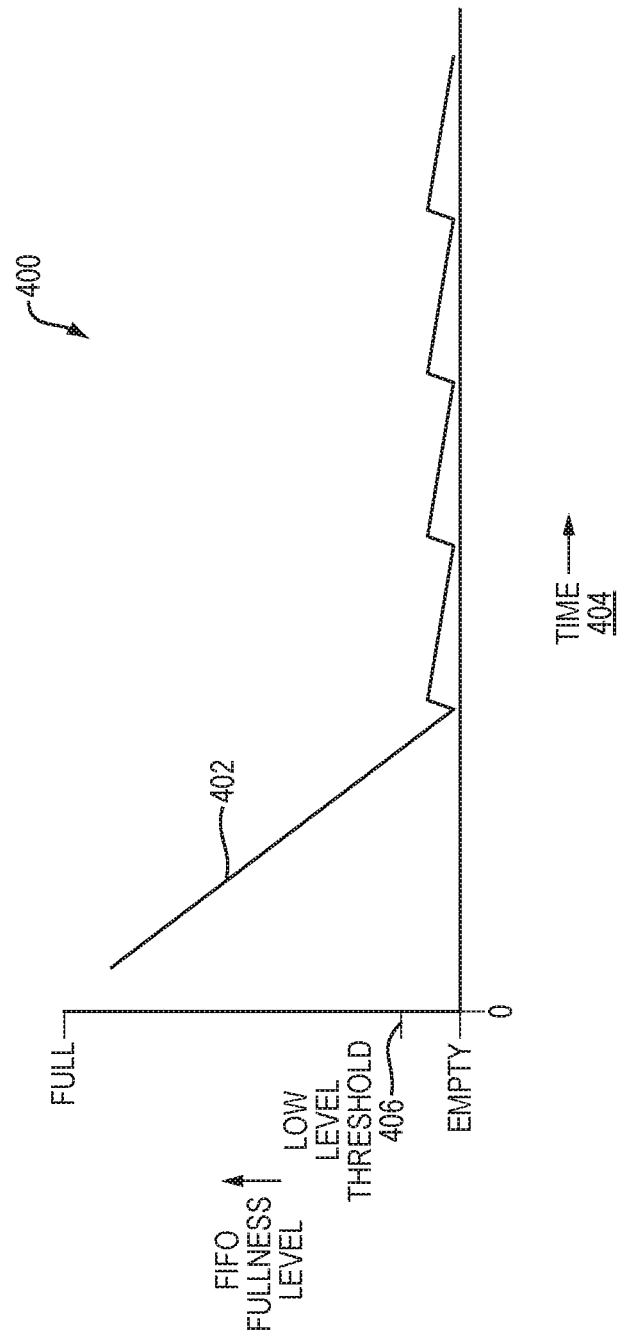
FIG. 4 is a graph that illustrates an effect of pacing data based on a fullness level of a FIFO in accordance with the present disclosure.

FIG. 4 is a graph 400 that illustrates an effect on the fullness 402 of the asynchronous FIFO 120 over time (404), based on the pacing of the producer, i.e., the producer 126. As disclosed above, a low indicator assertion, such as the low indicator assertion 334 of FIG. 3, may be asserted at the FIFO 120 based on a fullness of the FIFO 120 falling below a threshold, such as the low level threshold 406 of FIG. 4, and the producer rate (i.e., the pace rate) may be increased for a period, such as shown by the earlier production of the unit of data having the produced width 335 of FIG. 3, that is based on the low indicator assertion 334. As shown in the graph 400 of FIG. 4, once an initial fullness of the FIFO is worked through the system, the fullness level 402 of the FIFO 120 is maintained at a relatively low level.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
popping a First-In First-Out (FIFO) at a consumer rate corresponding to a consumer clock domain;
pushing the FIFO at a producer rate from an element operating in a producer clock domain, the producer rate slower than the consumer rate and the producer clock domain faster than the consumer clock domain;
asserting a low indicator at the FIFO based on a fullness of the FIFO falling below a threshold; and
increasing the producer rate for a period based on the low indicator asserted, the increasing causing a push to the FIFO a clock cycle earlier than otherwise caused by the producer rate.

2. The method of claim 1, further comprising determining the producer rate based on a credit return rate at which credits are returned from the consumer clock domain.

3. The method of claim 1, further comprising ignoring the low indicator asserted for an overlook time frame, following the push to the FIFO the clock cycle earlier than otherwise caused by the producer rate, to enable a given number of pushes to the FIFO at the producer rate, irrespective of the low indicator asserted.

4. The method of claim 3, wherein the overlook time frame corresponds to an integral number of producer clock domain clock cycles.

5. The method of claim 1, wherein the element operating in the producer clock domain is a converter element and the method further comprises:
producing, as a function of the producer rate, units of data having a produced width, by a producer element operating in the producer clock domain;
converting the produced units of data having the produced width to converted units of data having a converted width, by the converter element, the produced width greater than the converted width;
returning credits, from the FIFO to the producer element, via a synchronizing element operating between the consumer and producer clock domains, each credit returned indicating consumption, of a popped unit of data from the FIFO, by a consumer element in the consumer clock domain, each popped unit of data having the converted width;
synchronizing the credits returned to the producer clock domain, by the synchronizer element; and
determining the producer rate based on a credit return rate of the synchronized credits returned.

6. The method of claim 5, wherein determining the producer rate based on the credit return rate of the synchronized credits returned includes counting a number of producer clock domain clock cycles that transpire in an elapsed time frame, the elapsed time frame used for returning a given number of the synchronized credits, and wherein the method further comprises selecting a given number of produced units of data having the produced width for producing as a function of the number of producer clock domain clock cycles counted.

7. The method of claim 6, wherein the given number of the synchronized credits is a function of rounding down a value, to a nearest integer, and incrementing the rounded down value by one, wherein the value is computed by:
computing a product by multiplying the produced width by the selected given number of produced units of data having the produced width;
left shifting the computed product by a shift count value of one or more; and
dividing the left shifted computed product by the converted width.

8. The method of claim 6, wherein the selected given number of produced units of data having the produced width is a power of two.

9. The method of claim 8, wherein the selected given number of produced units of data having the produced width is 32.

10. The method of claim 6, further comprising pacing the producing, of the selected given number of produced units of data having the produced width, by the producer element as a function of the number of producer clock domain clock cycles counted.

11. The method of claim 10, wherein each unit of data having the produced width is produced every N number of producer clock domain clock cycles, wherein N is computed by:
right shifting the number of producer clock domain clock cycles counted by a shift count value of one or more; and
dividing the right shifted number of producer clock domain clock cycles by the selected given number of produced units of data having the produced width.

12. The method of claim 11, wherein, in an event dividing the right shifted number of producer clock domain clock cycles by the selected given number of produced units of data having the produced width results in a remainder value, pacing the producing includes delaying production of each next unit of data having the produced width to produce each next unit of data after the N number of producer clock domain clock cycles or after the N number of producer clock domain clock cycles plus one.

13. The method of claim 1, wherein the threshold is based on a disparity between the consumer and producer rates and a worst case delay for processing the low indicator asserted.

14. The method of claim 1, further comprising determining the producer rate based on a credit return rate at which credits are returned from the consumer clock domain, to enable an amount of data in flight between a producer element operating in the producer clock domain and a consumer element operating in the consumer clock domain to be minimized, to reduce a fullness level for the FIFO and a latency of data flowing from the producer element to the consumer element, each credit returned indicating consumption, by the consumer element, of a popped unit of data from the FIFO.

15. A system comprising:
a First-In First-Out (FIFO);
a consumer element operating in a consumer clock domain configured to consume popped units of data from the FIFO at a consumer rate corresponding to the consumer clock domain; and
a producer element operating in a producer clock domain configured to produce units of data for pushing to the FIFO at a producer rate, the producer rate slower than the consumer rate and the producer clock domain faster than the consumer clock domain, wherein the FIFO is configured to assert a low indicator based on a fullness of the FIFO falling below a threshold and wherein the producer element is further configured to increase the producer rate for a period based on the low indicator asserted, causing a push to the FIFO a clock cycle earlier than otherwise caused by the producer rate.

16. The system of claim 15, wherein the producer element is further configured to determine the producer rate based on a credit return rate at which credits are returned from the consumer clock domain.

17. The system of claim 15, wherein the producer element is further configured to ignore the low indicator for an overlook time frame, following the push to the FIFO the clock cycle earlier than otherwise caused by the producer rate, to enable a given number of pushes to the FIFO at the producer rate, irrespective of the low indicator asserted.

18. The system of claim 17, wherein the overlook time frame corresponds to an integral number of producer clock domain clock cycles.

19. The system of claim 15, wherein the produced units of data have a produced width, and the system further comprises:
a converter element operating in the producer clock domain and configured to convert the produced units of data having the produced width to converted units of data having a converted width, for pushing to the FIFO, the produced width greater than the converted width; and
a synchronizer element operating between the consumer and producer clock domains, wherein the FIFO is further configured to return credits to the producer element, via the synchronizer element, each credit returned indicating consumption, of a popped unit of data from the FIFO, by the consumer element, each popped unit of data having the converted width and the synchronizer element is configured to synchronize the credits returned to the producer clock domain, and the producer element is further configured to determine the producer rate based on a credit return rate of the synchronized credits returned.

20. The system of claim 19, wherein to determine the producer rate based on the credit return rate of the synchronized credits returned includes counting a number of producer clock domain clock cycles that transpire in an elapsed time frame used for returning a given number of the synchronized credits, and wherein the producer element is further configured to produce a selected given number of produced units of data having the produced width as a function of the number of producer clock domain clock cycles counted.

21. The system of claim 20, wherein the given number of the synchronized credits is a function of rounding down a value, to a nearest integer, and incrementing the rounded down value by one, wherein the value is computed by:
 computing a product by multiplying the produced width by the selected given number of produced units of data having the produced width;
 left shifting the computed product by a shift count value of one or more; and
 dividing the left shifted computed product by the converted width.

22. The system of claim 20, wherein the selected given number of produced units of data having the produced width is a power of two.

23. The system of claim 22, wherein the given number of produced units of data having the produced width is 32.

24. The system of claim 20, wherein the producer element is further configured to pace the producing of the selected number of produced units of data having the produced width as a function of the number of producer clock domain clock cycles counted.

25. The system of claim 24, wherein each unit of data having the produced width is produced every N number of producer clock domain clock cycles, wherein N is computed by:
 right shifting the number of producer clock domain clock cycles counted by a shift count value of one or more; and
 dividing the right shifted number of producer clock domain clock cycles by the selected given number of produced units of data having the produced width.

26. The system of claim 25, wherein, in an event dividing the right shifted number of producer clock domain clock cycles by the selected given number of produced units of data having the produced width results in a remainder value, to pace producing includes delaying production of each next unit of data having the produced width to produce each next unit of data after the N number of producer clock domain clock cycles or after the N number of producer clock domain clock cycles plus one.

27. The system of claim 15, wherein the threshold is based on a disparity between the consumer and producer rates and a worst case delay for processing the low indicator asserted.

28. The system of claim 15, wherein the producer element is further configured to determine the producer rate based on a credit return rate at which credits are returned from the consumer clock domain, to enable an amount of data in flight between the producer element and the consumer element to be minimized, to reduce a fullness level for the FIFO and a latency of data flowing from the producer element to the consumer element, each credit returned indicating consumption, by the consumer element, of a popped unit of data from the FIFO.

* * * * *